(12) United States Patent
Stephens

(10) Patent No.: US 6,409,817 B1
(45) Date of Patent: *Jun. 25, 2002

(54) FINE-CELLED FOAM COMPOSITION AND METHOD HAVING IMPROVED THERMAL INSULATION AND FIRE RETARDANT PROPERTIES

(75) Inventor: Douglas K. Stephens, Dickinson, TX (US)

(73) Assignee: Agritec, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,329

(22) Filed: May 8, 2000

Related U.S. Application Data

(63) Continuation-in-part of application No. 08/977,524, filed on Nov. 24, 1997, now Pat. No. 5,858,911, which is a division of application No. 08/677,875, filed on Jul. 10, 1996, now Pat. No. 5,714,000, which is a continuation-in-part of application No. 08/642,925, filed on May 6, 1996, now abandoned.

(51) Int. Cl.$^7$ .................. C04B 12/04; C04B 38/00; C04B 38/10

(52) U.S. Cl. ............ 106/601; 106/602; 106/603; 106/605; 106/618; 106/624; 106/632; 106/634; 106/122; 106/628; 106/637; 106/406; 106/407; 106/482; 264/41; 264/42; 264/45.1; 264/45.3; 264/50; 501/80; 501/84

(58) Field of Search ................... 106/601, 602, 106/603, 605, 618, 624, 632, 631, 634, 122, 406, 407, 482, 628, 637; 501/80, 84; 264/41, 42, 45.1, 45.3, 50

(56) References Cited

U.S. PATENT DOCUMENTS 3,856,539 A * 12/1974 Mallow et al. ............... 501/84
5,714,000 A * 2/1998 Wellen et al. ............. 106/601

\* cited by examiner

Primary Examiner—Michael Marcheschi
(74) Attorney, Agent, or Firm—James F. Weiler

(57) ABSTRACT

Disclosed is a rigid fine-celled light-weight foam composition and a method of producing it which has improved retention of liquids by absorption/adsorption which improves the thermal insulation and fire retardant properties of the fine-celled foam particularly suited for use in double walled tanks and hollow canopies, building panels, profiles, and the like.

10 Claims, No Drawings

FINE-CELLED FOAM COMPOSITION AND METHOD HAVING IMPROVED THERMAL INSULATION AND FIRE RETARDANT PROPERTIES

CROSS-REFERENCE TO RELATED APPLICATION

The present application is a continuation-in-part application of U.S. application Ser. No. 08/977,524, filed Nov. 24, 1997, now U.S. Pat. No. 5,858,911, which is a divisional application of U.S. application Ser. No. 08/677,875 filed Jul. 10, 1996, now U.S. Pat. No. 5,714,000, which is a continuation-in-part application of U.S. application Ser. No. 08/642,925 filed May 6, 1996, now abandoned.

FIELD OF THE INVENTION

The present invention relates to fine-celled rigid foams for retention of liquids having improved thermal insulation and fire retardant properties.

BACKGROUND OF THE INVENTION

The present invention constitutes an improvement over the fine-celled foam composition and method of U.S. Pat. No. 5,714,000 in that it has improved retention of liquids by absorption/adsorption which improves the thermal insulation and fire retardant properties of the fine-celled foam.

The stated uses for the fine-celled foam composition of U.S. Pat. No. 5,714,000 are for retention of liquids for floral, agricultural, nursery, horticulture use, such as for cut flowers, plant propagation mediums and growth cubes, soil conditioners, mulches, microwave and sound attenuation, filtration and liquid purification, industrial waste water containment and absorption, mediums for bioremediation, as a fire stop in hollow walled vessels and the like. The foam composition has from about 16 to 19 percent water hydrate (chemically bound water) and carbon particles diffused throughout the foam retain water. After the wet foam is dispensed into molds or receptacles, it is allowed to set in place for a period of 24 to 48 hours to allow excess liquid drainage and curing reaction; and then the damp foam is removed from the molds and placed in a leaching facility for removal of unwanted byproducts, such as sodium fluoride, any excess reactants, tall oil residue, and the like.

U.S. Pat. Nos. 5,081,761 and 5,695,089 describe and illustrate the use of cementitious, curable insulating materials as fire proofing material in the interstitial space or gap between two walls of a double wall tank.

U.S. Pat. No. 5,595,089 discloses a tank cavity filled with an insulating material comprised of perlite, cement, an air entrainment agent and water. The properties are described as: wet density from 28 to 40 pounds per cubic foot; compressive strength of about 25 to 150 psi; porosity of about 40 to 80 percent by volume. The porosity is sufficient to allow liquid and vapors to migrate through the insulation to monitoring points and also to an emergency vent port without over pressurization within the space. This insulating material contains chemically bound water hydrate in amounts sufficient to keep the temperature of the inner storage tank at an acceptable low level during an external fire. Such insulation, however, is relatively heavy, adding considerable weight when used in double wall tanks, overhead canopies, structures, and walls having cavities and the like.

U.S. Pat. Nos. 3,741,898 and 3,856,539 produce silica foam products without the inclusion of any substantial amounts of fillers or reinforcements. "Substantial amounts" of fillers or reinforcements were stated to be an amount in excess of about 10 percent on a dry basis or about 3 percent by weight of the alkali metal silicate (commercial sodium silicate) raw material on a wet basis. These foam products were produced for use as spray applied structural and insulation materials on walls, ceilings, and other relatively flat surfaces. The products were not commercially acceptable due to the long curing time (polymerization period) required to achieve sufficient rigidity, thereby, preventing flowing and sagging. The damp foam in this "uncured state" flowed and sagged from the surfaces leaving bare or thin spots of uneven coverage.

The terms "silica" and "silicate" have been used interchangeably in the trade. In the foregoing patents, a silica foam product from sodium silicate solution was defined as not having over a substantial amount of filler (10 percent) or reinforcement materials. In the present invention, considerably in excess of 10 percent "filler," such as activated carbon, absorbents/adsorbents are present; and the caustic silicate solution derived from caustic digestion of rice hull ash has about ½ percent by weight of metals.

Adsorption, which is often confused with absorption, refers to the adhering of molecules of gases or liquids to the surfaces of porous solids. Adsorption is a physical process that occurs when liquids, gases, or suspended matters adhere to the external surfaces, or the internal pore surfaces, of an adsorbent media such as activated carbon. Absorption is the process in which one substance penetrates into the body of another substance or fills the pores in a solid, usually through capillary action. An example is the absorption of water in the cellular structure of fine-celled foam. In the present invention the improved retention of liquids results from the fine-celled foam absorption acting synergistically with the adsorption capabilities of the fillers and activated carbon components of the foam composition. Therefore, for convenience, the combined term absorption/adsorption is used throughout the specification.

It would be highly desirable to provide a method for producing a relatively light weight, fine-celled, rigid foam composition which has improved thermal insulation and fire retardant properties.

It is also highly desirable to provide a method of producing a foam composition in which absorbent/adsorbent fillers are added in such a manner that they do not disrupt the fine-celled feature and integrity of the final foam product thereby resulting in sufficient porosity and compressive strength for use in double walled tanks and hollow canopies, building panels, profiles, and the like.

SUMMARY OF THE INVENTION

The present invention is directed to such a process and a relatively light weight foam product which has improved thermal insulation and fire retardant properties. The resulting foam is inorganic, non-cementitious, non-combustible, non-toxic, non-shrinking, non-degradable, non-corrosive on steel, resistant to acids, alkalis and oil, heat absorbing, with low thermal conductivity. The addition of absorbent/adsorbent fillers is performed in such a manner that they do not disrupt the fine-celled features and integrity of the final foam product. This results in sufficient porosity and compressive strength for use as insulation or fire retardant in double walled tanks and hollow canopies, building panels, profiles, and the like.

The foam is comprised of inorganic compounds including: Amorphous precipitated silica from a sodium silicate solution produced by caustic digestion of rice hull ash obtained by thermal pyrolysis of rice hulls; activated carbon from the thermal pyrolysis of rice hulls; sodium fluoride produced by the curing reaction; inorganic absorbent/adsorbent fillers such as calcite or ground limestone ($CaCO_3$), bentonitic clay, rice hull ash, ground particles of floral and horticultural foam scraps; chemically bound water (hydrate); and absorbed/adsorbed water and surface tension depressant, such as distilled tall oil.

The foam contains no cementitious materials including Portland cement, aluminous cement, or other cements.

The foam is non-combustible in that it will not burn or support combustion.

The foam is non-toxic with no toxic vapors or gases liberated upon heating.

The foam does not shrink during the curing process; therefore, the volume occupied is essentially constant. Also, the material is thermally isotropic which means it does not expand when heated. The foam matrix is isotropic since it has the same mechanical and physical properties in all directions.

The foam is non-degradable due to the stable nature of the inorganic compounds which are not biodegradable or chemically reactive.

The foam is non-corrosive on steel because the pH of the resulting mixture is in the 9.0 to 9.5 range which results in passavation of steel surfaces.

The foam is chemically inert when exposed to acids, alkalis, and oil solutions.

The foam has relatively high heat absorbing capability due to its specific heat capacity. The heat capacity is defined as the amount of heat, Joules or calories (BTU), required to raise the temperature of 1 kg (1 lb.) by 1° C. (1° F.) at constant pressure. The foam product heat capacity is about 1.4 to 1.5 times greater than that of the typical perlite-cement insulating materials.

The thermal conductivity of the foam product is lower than perlite-cement insulation. Thermal conductivity is measured by determining the heat flux or flow from a surface at temperature $T_1$ to one at $T_2$ in the material, separated by a distance x.

The porosity is in the range of 67 to 73 percent by volume with compressive strength in the range of 40 to 125 psi.

The foam is rigid; a majority of its cells are of a size from about 40 to 60 microns, silicon dioxide comprises from about 7.0 percent to 30.5 percent by weight, hydrate comprises about 1.0 percent to 6.5 percent by weight, absorbent/adsorbent filler particles comprise about 7.5 percent to 42.0 percent, activated carbon comprises about 2.5 percent to 22.0 percent by weight, absorbed/adsorbed water comprises about 42.0 percent to about 57.0 percent of foam composition.

The present invention is also directed to an improved process for producing the foam product as follows: The base fine-celled foam is produced in the same manner and with the same equipment as specified in Example 1 (Presently Preferred Embodiment) of U.S. Pat. No. 5,714,000 with the following exceptions:

1. The cotton flock reinforcing fibers are not added to the sodium amorphous silicate solution from rice hull ash (RHA).
2. The compressed air or nitrogen injected into the high speed, high shear mixer (Oakes) is reduced to produce the wet foam density in the range of 15 to 20 pounds per cubic foot.

The wet foam is dispensed through a hose to a blender or mixer for the incorporation of the hydration enhancing fillers. In this process, the term "hydration" applies to both the chemical reaction to form hydrates and the absorption/adsorption which limits free liquid drainage from the resulting matrix.

The absorbent/adsorbent fillers, such as calcite, bentonite clay, rice hull ash, ground foam scraps, are mixed with water in a ribbon blender or mortar mixer to form a viscous slurry. As the base foam is dispensed into the blender or mixer, the slurry is mixed and uniformly dispersed into the final product matrix. This results in an insulation or fire retardant product with a wet density in the range of 19 to 26 pounds per cubic foot. The progress of the mixing is monitored by frequent sampling of the product for wet density determination. The mixing is complete when there are only small variations of less than 0.5 pounds per cubic foot in the wet density.

There are several commercial mixers or blenders available including the MQ Whiteman Company, Boise, Id., mortar mixers and the Strong Manufacturing Co., Pine Bluff, Ark., Fillermate Series machines. The final product mixer needs to be equipped with a progressive cavity pump capable of transferring the high viscosity insulation slurry to the vessel or hollow member receptacle.

The absorbent/adsorbent filler particles are of a size that will not cause disruption to the fine-celled foam cellular structure or cause voids in the final product. It has been determined that particle sizes of 100 percent passing through a U.S. Standard 200 mesh (75 microns) satisfy this requirement.

Commercially available rice hull ash currently is produced by gasification or by combustion or by incineration of rice hulls in a furnace. Gasification is the conversion of the hydrocarbon or carbohydrate components in a solid fuel into gases through the application of heat. Combustion is the act or process of burning or a chemical change, especially oxidation, accompanied by the production of heat and light. Incineration is the act of consuming by burning to ashes. Thermal pyrolysis is a chemical change that occurs in a substance through the application of heat. For convenience, the term "thermal pyrolysis" includes gasification, combustion, incineration, and any and all forms of heat which produces rice hull ash and amorphous carbon from rice hulls. Any process in which thermal pyrolysis is used to produce rice hull ash and amorphous carbon from rice hulls may be used in the present invention.

It has been recognized that certain agricultural byproducts or waste materials have varying quantities of biogenic silica, that is, silica which is developed, assimilated or occurs in the cell structures of living organisms such as plants. These byproducts, commonly referred to as "biomass", are principally rice hulls, rice straw, wheat straw, and sugarcane baggase. Other plants that contain biogenic silica, include equisetum ("horsetail weeds"), certain palm leaves ("palmyra palm"), and certain bamboo stems. The biogenic silica in these agricultural byproducts and plants lacks distinct crystalline structure, which means it is amorphous with some degree of porosity.

Dry rice hulls are comprised of about 60% cellulose and hemicellulose, 20% lignin, 19% silica, 0.5% nitrogen and sulfur, and 0.5% mineral elements such as phosphorus, magnesium, manganese, iron, potassium, sodium, aluminum, titanium, and calcium. When rice hulls are combusted, the solid material or ash remaining comprises about 20% of the starting quantity of hulls by weight and consists primarily of silica, minerals and any uncombusted carbon.

Dry sugarcane bagasse is typically comprised of about 6% sugar (carbohydrates) and 94% fibrous material (cellulose, hemicellulose, lignin, silica, and minerals). Chemical analyses of bagasse ash yields: 60–73% $SiO_2$, 3–6% $Al_2O_3$, 2–3% CaO, 5–6% $Fe_2O_3$, 3–4% $K_2O$, 3–4% MgO, 3–4% $Na_2O$, 4–5% $P_2O_5$, and 4–17% uncombusted carbon.

Agricultural waste materials or biomass have potential useful fuel value and are used as low grade fuel to produce steam and electricity in a number of locations, especially near rice milling and sugarcane processing operations. Direct combustion and incineration have been utilized for many years as an expeditious method to dispose of rice hull waste. In the usual incineration of rice hulls, furnaces have been designed to operate at extremely high temperatures without regard to the form of silica produced by this incineration. The phase diagram of silicon dioxide indicates that a transition from the amorphous, non-crystalline form to the crystalline forms known as tridymite and crystobalite takes place at temperatures above 2000° F. (1093° C.) when the silica is in pure state. However, the incineration of biogenic material, such as rice hulls at temperatures in the 1800° F. to 2000° F. range for any prolonged exposure period, has led to the formation of crystalline silica because the transition temperature from amorphous to crystalline is reduced by the presence of other components of the original rice hulls.

U.S. Pat. Nos. 3,889,608 and 3,959,007 disclose a furnace and process for the incineration of biogenic material, such as rice hulls to produce useable energy and a highly reactive amorphous form of silica in the ash. In the current incineration or direct combustion process, raw rice hulls are exposed to elevated temperature in an excess of air in the combustion zone of a cylindrical furnace, and the ash is continuously removed from the bottom. The hulls are incinerated at a gas mass temperature of between 1250° F. (677° C.) and 1500° F. (815° C.) at relatively high levels of turbulence under conditions whereby the temperature of the rice hulls does not exceed about 1300° F. (704° C.). Gas mass temperatures of between 1250° F. (677° C.) and 1350° F. (732° C.) are preferred when a crystalline free ash is desired. Upon leaving the furnace, the ash is rapidly cooled to provide ease in handling. The incineration or combustion of rice hulls and other biogenic materials are time-temperature related, and burning of them under these conditions produces biogenic ash, such as rice hull ash having carbon particles from the burning of the hulls which activates the carbon. Incineration of the hulls in this manner produces from about 3 percent to about 14 percent by weight of activated carbon. Also, when rice hulls and other biogenic materials are incinerated in this manner, the silica in the ash remains in a relatively pure amorphous state rather than in the crystalline forms known as quartz, tridymite, or crystobalite.

The significance of having the silica in an amorphous state is that the silica maintains a porous skeletal structure which provides better chemical reactivity and solubility during operations such as caustic digestion of the ash. From a safety standpoint, a commonly known health hazard which has been associated historically with the inhalation of crystalline silica dusts is silicosis. In 1997, a working group of the International Agency for Research on Cancer (IARC) published a monograph classifying inhaled crystalline silica from occupational sources as carcinogenic to humans, and categorized it as an IARC Group 1 agent. The Occupational Safety and Health Administration (OSHA) regulations and its OSHA Hazard Communication Standard, state right-to-know laws, and other applicable federal, state, and local laws and regulations on crystalline silica establish Permissible Exposure Limits (PELs) for airborne crystalline silica. OSHA has published general industry PELs for three different forms of crystalline silica. Cristobalite and tridymite are forms of crystalline silica, less abundant than quartz, that have lower PELs than quartz. These PELs for crystalline silica in general industry are listed in the "Code of Federal Regulations," 29 CFR 1910.1000, "Air Contaminants," under Table Z-3, "Mineral Dusts".

In the incineration process, all of the oxidation or combustion takes place rapidly and, typically in a single chamber where the biomass materials are placed in intimate contact with oxygen. This can result in competing reactions which can produce $NO_x$ (oxides of nitrogen), $SO_x$ (oxides of sulfur), and other compounds which are potential environmental contaminants. These and several other limitations have brought about development of gasification type combustion of biomass fuels. Biomass gasification involves the high temperature, about 1450° F. (788° C.), conversion of agricultural wastes, such as rice hulls and sugarcane bagasse, into combustible gases, such as hydrogen, carbon monoxide, methane, ethane and non-combustibles, such as carbon dioxide, water, and ash. The gases are then burned in a combustion chamber or in the radiant section of a boiler for production of steam and electricity. The ash is automatically and continuously discharged and cooled in its dry state. Components of the system normally include a two or three stage gasifier, boiler, steam turbine, generator, condenser and control system.

U.S. Pat. Nos. 4,517,905 and 4,589,355 disclose a gasifier where the carbon content of the ash residue from combustion of agricultural wastes, such as rice hulls, and the fly ash content of the gaseous exhaust are controlled. The combustion process is performed in a traditional manner using underfire and overfire air to support efficient gasification of the rice hulls or other feedstock, which results in production of a combustible gas mixture that is carried through a fire train to a boiler, steam turbine or other energy recovery system. A variable feed system, which when manipulated in conjunction with other variables, can produce ash with carbon contents from about 10% to the high 30% range. Operating instructions provide for control of the combustion chamber temperatures in the range of 1280° F. (693° C.) to 1460° F. (793° C.). The corresponding combustion gas (boiler feed) temperatures are in the range of 1360° F. (738° C.) to 1600° F. (871° C.). This combustion chamber temperature range is sufficient to devolatize rice hulls and allow partial combustion of some of the fixed carbon in the hulls. The specially designed feed system and temperature control mechanism permit the production of a dry, amorphous ash from rice hulls.

Any process in which thermal pyrolysis, including the aforementioned incineration, combustion, and gasification processes, is used to produce biogenic ash, such as rice hull ash and activated carbon from them may be used in the present invention. The biogenic silica is obtained by the controlled combustion of biogenic materials so that substantially all of the silica is in an amorphous rather than a crystalline state although minor amounts of crystalline silica can be present. While amorphous silica in the ash is preferred, some crystalline silica can be accommodated by manipulating caustic digestion variables such as temperature and pressure in the reaction. Generally, in the commercial burning of rice hulls as an energy source, the resulting ash includes about 0.5% to 1.0% of trace metals, such as magnesium, potassium, iron, aluminum, calcium, titanium, and manganese. The concentration of these metals is dependent upon the soil conditions and composition in which the rice plants and other biogenic materials are grown.

U.S. Pat. No. 5,833,940 discloses the production of liquid silicates from biogenic silica, by dissolving in a closed container biogenic silica, preferably rice hull ash, in a strong alkali solution, preferably sodium hydroxide in the presence of an active carbon material. The production of a caustic silicate solution, such as sodium silicate, from biogenic silica in rice hull ash is a caustic digestion process. Biogenic material ash, preferably, rice hull ash, with dispersed activated carbon is heated with a caustic solution, such as sodium hydroxide, which reacts with the amorphous silica to create sodium silicate solution. As mentioned previously, the carbon content in the rice hull ash or other biogenic material can approach the high 30% levels depending on the type of thermal pyrolysis used to burn them. The carbon is an inert material during the reaction and excess carbon is not harmful to the reaction. The principal caustic digestion chemical reaction is characterized as follows:

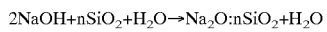

$$2NaOH + nSiO_2 + H_2O \rightarrow Na_2O:nSiO_2 + H_2O$$

where "n" represents the silica/alkali weight ratio

For the current industry standard sodium silicate liquid solution, the chemical equation becomes:

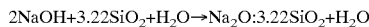

$$2NaOH + 3.22SiO_2 + H_2O \rightarrow Na_2O:3.22SiO_2 + H_2O$$

Present commercial grades of liquid sodium silicates not derived from rice hull ash range in silica/alkali weight ratios from about 1.6 to about 3.8. Such ratios are satisfactory for the rice hull ash and other biogenic ash derived liquid sodium silicate in the present invention.

As described in U.S. Pat. Nos. 5,714,000 and 5,858,911, activated carbon is generated in quantities ranging from about 3 percent to as much as 40 percent by weight in rice hull ash depending on the type of thermal pyrolysis utilized to burn rice hulls. During the caustic digestion of rice hull ash to produce sodium silicate solution, the biogenic silica reacts with the alkaline element (sodium oxide in the caustic solution) and becomes a soluble compound in the silicate solution. The activated carbon remains an inert material and becomes suspended solids in the silicate solution. Advantageously, it has been determined in the present invention, the compositions of the dilute, unfiltered sodium silicate liquids derived from caustic digestion of rice hull ash with carbon quantities in 3% to 40% by weight range, are ideally suited for the production of fine-celled rigid foams for retention of liquids having improved thermal insulation and fire retardant properties. In the event the carbon content of the biogenic ash or other biomass ash is too high for the intended end use, all of the activated carbon can be filtered out and the desired amount added to the caustic silicate solution prior to initiating the foaming operations. Specifically, the silica/alkali weight ratios ($SiO_2/Na_2O$), dissolved silicate solids ($Na_2O:nSiO_2$), suspended carbon particles and water quantities in the aqueous solutions, with the addition of various absorbents/adsorbents, are within the ranges necessary to produce the fine-celled foam having improved thermal insulation and fire retardant properties.

As previously mentioned, during the thermal pyrolysis of rice hulls and the caustic digestion of the amorphous rice hull ash to produce a sodium silicate solution, the activated carbon particles are reduced to sizes that are consistently smaller than commercially available granular activated carbon (GAC) and powdered activated carbon (PAC). Common crushed granular activated carbon sizes are 12×40 and 8×30 U.S. standard mesh, which range in diameter from 1,680 to 425 microns and 2,380 to 590 microns, respectively. Commercially available PACs typically have particle sizes of 65 to 90 percent passing a U.S. Standard 325 mesh (45 microns) sieve. The activated carbon in the unrefined sodium silicate solution derived from the caustic digestion of rice hull ash has particle sizes of 100 percent passing a U.S. Standard 500 (25 microns) sieve with the average size of about 12 microns diameter.

The particle sizes of the suspended solids, such as activated carbon, in the caustic silicate solution raw material are critical because larger particles disrupt the normal cellular structure in the polymerized silicon dioxide foam product. This disruption results in decreased absorption/adsorption and retention of liquids. The particle size distribution is also important because the smaller carbon particles adsorb more rapidly than larger particles.

Accordingly, it is an object of the present invention to provide a foam composition and its method of production, which foam composition has thermal insulation and fire retardant properties.

It is a further object of the present invention to provide such a foam composition which is inexpensive, relatively light-weight, and has sufficient porosity and compressive strength for use as insulation or fire retardant in double walled tanks and hollow building panels or profiles.

It is a further object of the present invention to provide such a rigid foam composition and a method of providing it which is inorganic, non-cementitious, non-combustible, non-toxic, non-shrinking, non-degradable, non-corrosive on steel, resistant to acids, alkalis and oils, heat absorbing with low thermal conductivity.

Other and further objects, features, and advantages of the invention are set forth throughout the specification and claims and are inherent in the invention.

DESCRIPTION OF PRESENTLY PREFERRED EMBODIMENT

The present invention is directed to a process and a foam product which utilizes a caustic silicate solution produced by the caustic digestion of a biomass ash, preferably rice hull ash obtained by thermal pyrolysis of rice hulls, a surface tension depressant, a polymer forming agent, and an aqueous slurry of absorbent/adsorbent filler particles. Activated carbon is generated during the thermal pyrolysis process which passes through the caustic digestion as an inert material. The particle sizes of the activated carbon and the absorbent/adsorbent fillers are such that they do not disrupt the cellular structure of the foam product. The activated carbon in the foam product acts synergistically with the cellular structure to absorb/adsorb and retain liquid. The absorbent/adsorbent particles absorb/adsorb free water and hold it in the cells of the foam composition.

The method of the invention comprises foaming a mixture of a caustic silicate solution which has been derived by caustic digestion of silica containing biomass ash such as rice hull ash, with diffused activated carbon from the thermal pyrolysis of rice hulls, which activated carbon passes as an inert material during the caustic digestion process and which is of reduced particle size which does not disrupt the cellular structure of the resulting foamed product, a surface tension depressant, a polymer forming agent, and blending with an aqueous slurry of absorbent/adsorption particles effective to absorb/adsorb free water in the resulting foam composition discharged into cavities in double wall tanks or designated receptacles for hardening and curing completion.

The resulting foam is a rigid, fine-celled foam product or composition comprised of amorphous precipitated silica from thermal pyrolysis of rice hulls, activated carbon particles, absorbent/adsorbent particles being of a particle size not disruptive of the fine cellular structure of the foam composition, and hydrated water. Preferably, the foam composition comprises by weight about 7.0 to 30.5 percent silica, about 2.5 to 22.0 activated carbon, about 7.5 to 42.0 percent absorbent/adsorbent, about 1.0 to 6.5 percent water hydrate, about 42.0 to 57.0 percent absorbed/adsorbed water, a majority cell size of about 40 to 60 microns diameter, has a dry density of from about 21.7 to 28.5 pounds per cubic foot, and trace metals 0.5 to 1.0 percent. The following Example 1 is a presently preferred method for making the foam composition of the invention.

EXAMPLE 1

An amorphous sodium silicate solution from rice hull ash (RHA) was analyzed to determine the $SiO_2/Na_2O$ ratio, the soluble solids (Si:Na solids), the suspended solids (carbon+unreacted RHA), the total solids, and the weight percent water in the unrefined RHA sodium silicate. These properties are critical to the overall chemical reaction balance regarding quantity of polymer forming agent to utilize.

An aqueous sodium fluorosilicate solution (SFS, preferred polymer forming agent) was analyzed to determine the percent solids in the aqueous solution. The preferred SFS solids range is 50 percent to 60 percent by weight of the aqueous solution.

A surface tension depressant, preferably tall oil mix, was prepared by mixing 80 percent distilled tall oil with 20 percent oleic acid.

The amorphous sodium silicate solution, aqueous sodium fluorosilicate solution, and surface tension depressant feed streams were placed in appropriate sized tanks or vessels which were connected via piping systems to positive displacement pumps. The preferred pumps were Robbins Myers Moyno® pumps capable of pumping viscous slurries with abrasive solids.

The pumps were set to feed the three streams at the following ratio on an anhydrous basis (reactive solids basis): $Na_2O:SiO_2$—100 weight parts/$Na_2SiF_6$—36.83 weight parts/Tall oil mix—2 weight (liquid) parts. This is the exact theoretical stoichiometric ratio for the reaction to achieve 100 percent completion. In actual practice, the feed ratios have been varied from a low of 100 parts $Na_2O:SiO_2$ to 41.7 parts SFS; to a high of 100 parts $Na_2O:SiO_2$ to 33.8 parts SFS. The preferred ratio is as close to the stoichiometric as practical in order to reduce unreacted components that have to be removed from the foam product by further processing.

The reactants were pumped to a continuous, high speed (500–600 RPM), high shear mixer, which produced the wet foam. There are several commercial mixers available including those manufactured by: E. T. Oakes Corporation (preferred), Perpetual Machine Company, Charles Ross & Son Company, and others. Accordingly, no detailed description is deemed necessary or given.

Compressed air or nitrogen was injected into the mixer at a rate to produce the desired wet foam density of about 15.78 pounds per cubic foot. The absorbent/adsorbent filler particles consisting of 50 pounds of calcite ($CaCO_3$) supplied by ECC Calcium Products, Inc., product name Micro-White 100, were premixed with 22 pounds of water in a MQ Whiteman mixer to form an absorbent/adsorbent slurry. The black silicate foam was delivered by a hose to the MQ mixer for blending with the absorbent/adsorbent filler slurry. After the mixing was completed, the resulting insulation foam product was discharged into receptacles in double wall tanks for hardening and curing completion. The mixture was allowed to cure for 24 hours at temperatures from 75° F. to 90° F. and 48 hours at temperatures from 50° F. to 75° F.

The properties and composition of the foam composition produced by the processes in Example 1 were within the ranges set forth in the following Table 1.

TABLE 1

| Property | Value |
| --- | --- |
| Wet density | 22.3 pounds per cubic foot |
| Compressive strength | 41–48 psi |
| Porosity | 67 percent by volume |
| Specific heat capacity | 1.63–1.71 BTU/lb-° F. |
| PH | 9.6–9.8 |

| Composition | Weight Percent |
| --- | --- |
| Silicon dioxide ($SiO_2$) | 11.04 percent |
| Sodium fluoride (NaF) | 7.92 percent |
| Activated carbon (C) | 4.13 percent |
| Calcium carbonate ($CaCO_3$) | 26.06 percent |
| Aluminum oxide ($Al_2O_3$) | 0.04 percent |
| Hydrated water | 0.97 percent |
| Tall oil | 1.75 percent |
| Absorbed/adsorbed water | 48.09 percent |
| | 100.00 percent |

EXAMPLE 2

In this example, the fine-celled foam production method was the same as Example 1. The compressed air injected into the Oakes mixer was at a rate to produce black silicate foam (without fillers) at a wet density of 15.32 pounds per cubic foot (PCT). The absorbent/adsorbent filler consisted of 100 pounds of calcite ($CaCO_3$), Micro-White 100, premixed with 44 pounds of water to a slurry in a MQ Whiteman mixer. After mixing was completed, the insulation foam product was discharged into the desired receptacle for hardening and curing. The cure times were the same as Example 1.

The feedstocks in this example by weight percent comprised: RHA sodium silicate 33.15 percent, sodium fluorosilicate polymer forming agent 6.77 percent, surface tension depressant tall oil 1.27 percent, and $CaCO_3$ slurry 58.81 percent. The properties and composition of the insulation foam produced in Example 2 were as follows:

TABLE 2

| Property | Value |
| --- | --- |
| Wet density | 28.5 pounds per cubic foot |
| Compressive strength | 37–45 psi |
| Porosity | 70 percent by volume |
| Specific heat capacity | 1.24–1.26 BTU/lb-° F. |
| PH | 9.6–9.8 |

| Composition | Weight Percent |
| --- | --- |
| Silicon dioxide ($SiO_2$) | 7.69 |
| Sodium fluoride (NaF) | 4.92 |
| Activated carbon (C) | 2.50 |
| Calcium carbonate ($CaCO_3$) | 40.86 |
| Aluminum oxide ($Al_2O_3$) | 0.02 |
| Hydrated water | 0.67 |
| Tall oil | 1.28 |
| Absorbed/adsorbed water | 42.07 |
| | 100.01 |

EXAMPLE 3

In this example, the fine-celled foam production method was the same as Example 1. The compressed air injected into the Oakes mixer was at a rate to produce black silicate foam (without fillers) at a wet density of 15.54 pounds per cubic foot (PCF). The absorbent/adsorbent filler consisted of 50 pounds of calcite ($CaCO_3$), Micro-White 100, premixed with 17.6 pounds of water to a slurry in a MQ Whiteman mixer. After mixing was completed, the insulation foam product was discharged into the desired receptacle for hardening and during. The cure times were the same as Example 1.

The feedstocks in this example by weight percent comprised: RHA sodium silicate 51.20 percent, sodium fluorosilicate polymer forming agent 10.72 percent, surface tension depressant tall oil 1.86 percent, and $CaCO_3$ slurry 36.22 percent. The properties and composition of the insulation foam produced in Example 3 were as follows:

TABLE 3

| Property | Value |
| --- | --- |
| Wet density | 21.7 pounds per cubic foot |
| Compressive strength | 45–50 psi |
| Porosity | 73 percent by volume |
| Specific heat capacity | 1.52–1.73 BTU/lb-° F. |
| PH | 9.2–9.6 |

| Composition | Weight Percent |
| --- | --- |
| Silicon dioxide ($SiO_2$) | 11.92 |
| Sodium fluoride (NaF) | 7.71 |
| Activated carbon (C) | 3.86 |
| Calcium carbonate ($CaCO_3$) | 26.81 |
| Aluminuin oxide ($Al_2O_3$) | 0.04 |
| Hydrated water | 1.04 |
| Tall oil | 1.86 |
| Absorbed/adsorbed water | 46.76 |
| | 100.00 |

EXAMPLE 4

In this example, the fine-celled foam production method was the same as Example 1. The compressed air injected into the Oakes mixer was at a rate to produce black silicate foam (without fillers) at a wet density of 20.64 pounds per cubic foot (PCF). The absorbent/adsorbent filler consisted of 50 pounds of calcite ($CaCO_3$), Micro-White 100, premixed with 18.7 pounds of water to a slurry in a MQ Whiteman mixer. After mixing was completed, the insulation foam product was discharged into the desired receptacle for hardening and curing. The cure times were the same as Example 1.

The feedstocks in this example by weight percent comprised: RHA sodium silicate 55.66 percent, sodium fluorosilicate polymer forming agent 11.89 percent, surface tension depressant tall oil 2.11 percent, and $CaCO_3$ slurry 30.34 percent. The properties and composition of the insulation foam produced in Example 4 were as follows:

TABLE 4

| Property | Value |
| --- | --- |
| Wet density | 26.1 pounds per cubic foot |
| compressive strength | 120–124 psi |
| Porosity | 69 percent by volume |
| Specific heat capacity | 1.55–1.66 BTU/lb-° F. |
| PH | 9.0–9.2 |

TABLE 4-continued

| Composition | Weight Percent |
| --- | --- |
| Silicon dioxide ($SiO_2$) | 12.27 |
| Sodium fluoride (NaF) | 8.11 |
| Activated carbon (C) | 4.26 |
| Calcium carbonate ($CaCO_3$) | 22.25 |
| Aluminum oxide ($Al_2O_3$) | 0.04 |
| Hydrated water | 1.08 |
| Tall oil | 2.13 |
| Absorbed/adsorbed water | 49.86 |
| | 100.00 |

EXAMPLE 5

In this example, the fine-celled foam production method was the same as Example 1. The compressed air injected into the Oakes mixer was at a rate to produce black silicate foam (without fillers) at a wet density of 21.12 pounds per cubic foot (PCF). The absorbent/adsorbent filler consisted of 14 pounds of calcite ($CaCO_3$), Micro-White 100, premixed with 5.5 pounds of water to a slurry in a MQ Whiteman mixer. After mixing was completed, the insulation foam product was discharged into the desired receptacle for hardening and curing. The cure times were the same as Example 1.

The feedstocks in this example by weight percent comprised: RHA sodium silicate 72.67 percent, sodium fluorosilicate polymer forming agent 16.68 percent, surface tension depressant tall oil 2.66 percent. and $CaCO_3$ slurry 9.99 percent. The properties and composition of the insulation foam produced in Example 5 were as follows:

TABLE 5

| Property | Value |
| --- | --- |
| Wet density | 22.7 pounds per cubic foot |
| Compressive strenqth | 72–78 psi |
| Porosity | 70 percent by volume |
| Specific heat capacity | 1.54–1.55 BTU/lb-° F. |
| PH | 9.0–9.1 |

| Composition | Weight percent |
| --- | --- |
| Silicon dioxide ($SiO_2$) | 15.94 |
| Sodium fluoride (NaF) | 10.29 |
| Activated carbon (C) | 5.58 |
| Calcium carbonate ($CaCO_3$) | 7.25 |
| Aluminum oxide ($Al_2O_3$) | 0.04 |
| Hydrated water | 1.40 |
| Tall oil | 2.69 |
| Absorbed/adsorbed water | 56.81 |
| | 100.00 |

EXAMPLE 6

In this example, the fine-celled foam production method was the same as Example 1. The compressed air injected into the Oakes mixer was at a rate to produce black silicate foam (without fillers) at a wet density of 20.84 pounds per cubic foot (PCF). The absorbent/adsorbent filler consisted of 50 pounds of recycled, ground silicate foam scraps from floral foam cutting, premixed with 18.7 pounds of water to a slurry in an MQ Whiteman mixer. After mixing was completed, the insulation foam product was discharged into the desired receptacle for hardening and curing. The cure times were the same as Example 1. The feedstocks in this example by weight percent comprised: RHA sodium silicate 63.03 percent, sodium fluorosilicate polymer forming agent 16.43 percent, surface tension depressant tall oil 1.89 percent, and ground silicate foam slurry 18.66 percent. The properties and composition of the insulation foam produced in Example were as follows:

TABLE 6

| Property | Value |
| --- | --- |
| Wet density | 23.3 pounds per cubic foot |
| Compressive strenqth | 26–28 psi |
| Porosity | 70 percent by volume |
| Specific heat capacity | 1.91–1.95 BTU/lb-° F. |
| PH | 9.0–9.3 |

| Composition | Weight Percent |
| --- | --- |
| Silicon dioxide (SiO2) | 24.06 |
| Sodium fluoride (NaF) | 10.68 |
| Activated carbon (C) | 6.22 |
| Calcium carbonate ($CaCO_3$) | 7.25 |
| Aluminum oxide ($Al_2O_3$) | 0.05 |
| Hydrated water | 1.49 |
| Tall oil | 1.49 |
| Cotton flock | 0.55 |
| Absorbed/adsorbed water | 53.71 |
| | 100.00 |

EXAMPLE 7

In this example, the fine-celled foam production method was the same as Example 1. The compressed air injected into the Oakes mixer was at a rate to produce black silicate foam (without fillers) at a wet density of 20.73 pounds per cubic foot (PCF). The absorbent/adsorbent filler utilized was rice hull ash (RHA). This RHA was the higher carbon content ash produced by gasification thermal pyrolysis. The composition of the RHA utilized was about 72.2 percent by weight silicon dioxide ($SiO_2$) and 27.8 percent activated carbon resulting from the combustion process. The RHA was obtained from Producer's Rice Mill in Stuttgart, Ark. The absorbent/adsorbent filler consisted of 50 pounds of RHA, premixed with 18.7 pounds of water to a slurry in an MQ Whiteman mixer. After mixing was completed, the insulation foam product was discharged into the desired receptacle for hardening and curing. The cure times were the same as Example 1.

The feedstocks in this example by weight percent comprised: RHA sodium silicate 64.36 percent, sodium fluorosilicate polymer forming agent 14.61 percent, surface tension depressant tall oil 2.17 percent, and rice hull ash slurry 18.86 percent. The properties and composition of the insulation foam produced in Example 7 were as follows:

TABLE 7

| Property | Value |
| --- | --- |
| Wet density | 24.0 pounds per cubic foot |
| Compressive strength | 32–38 psi |
| Porosity | 72 percent by volume |
| Specific heat capacity | 1.96–1.97 BTU/lb-° F. |
| PH | 9.2–9.4 |

| Composition | Weight Percent |
| --- | --- |
| Silicon dioxide ($SiO_2$) | 25.52 |
| Sodium fluoride (NaF) | 9.80 |
| Activated carbon (C) | 7.00 |

TABLE 7-continued

| Aluininum oxide ($Al_2O_3$) | 0.06 |
| --- | --- |
| Hydrated water | 1.15 |
| Tall oil | 1.73 |
| Absorbed/adsorbed water | 54.74 |
| | 100.00 |

A satisfactory porous rigid foam composition having thermal insulation and fire retardant properties is obtained when the biomass ash is rice straw, wheat straw, sugarcane baggase, equisetum, palm leaves, bamboo stems, and other agricultural byproducts or waste materials having quantities of biogenic silica and mixtures thereof.

Also, satisfactory porous rigid foam compositions having thermal insulation and fire retardant properties are obtained when the absorbent/adsorbent particles are calcite bentonite clay, rice hull ash, ground scraps of the foam composition of the invention or mixtures thereof.

Similarly, satisfactory porous rigid foam compositions having thermal insulation and fire retardant properties are obtained when other surface tension depressants are substituted such as palmitic, oleic, stearic, linoleic, naphthenic acids or soaps; rosin acids, tall oil acid, fatty acids; corn oil, soybean oil, and tallow acids.

Also, satisfactory porous rigid foam compositions having thermal insulation and fire retardant properties are obtained when other polymer forming agents are substituted, such as potassium fluorosilicate, calcium and zinc borates, lithium calcium borates, sodium calcium borates, and boric acid.

Accordingly, the present invention is well suited and adapted to attain the ends and carry out the objectives set forth and has the advantages and features mentioned as well as others inherent therein.

While presently preferred examples of the embodiments of the invention have been given for the purposes of disclosure, changes can be made therein which are within the spirit of the invention as defined by the scope of the appended claims.

What is claimed is:

1. A method of making a rigid fine-celled foam composition having thermal insulation and fire retardant properties in which a majority of its cells are of a size from about 40 to about 60 microns comprising,
    foaming a mixture of components comprising,
        (a) a caustic silicate solution produced by caustic digestion of biomass ash containing silica and activated carbon, the ash being obtained from thermal pyrolysis of the biomass,
        (b) a surface tension depressant,
        (c) a polymer forming agent, and
        (d) an aqueous slurry of absorbent/adsorbent particles effective to absorb/adsorb free water in the resulting rigid fine-celled foam composition, the activated carbon and absorbent/adsorbent particles being of a size not disruptive of the cells of the rigid fine-celled foam structure,
        (e) the mixture being formed into the rigid fine-celled foam.

2. The method of claim 1 where,
    the biomass ash is selected from the group consisting of ash of rice hulls, rice straw, wheat straw, sugarcane baggase, equisetum, palmyra leaves, bamboo stems, and other biogenic materials having qualities of biogenic silica and combinations thereof.

3. The method of claim 1 where,
the absorbent/adsorbent particles are selected from the group consisting of calcite, bentonite clay, rice hull ash, ground foam scraps and mixtures thereof.

4. The method of claim 1 where,
the polymer forming agent is selected from the group consisting of sodium fluorosilicate, potassium fluorosilicate, calcium and zinc borates, lithium calcium borates, sodium calcium borates, and boric acid.

5. The method of claims 1, 2, 3, or 4 comprising discharging the resulting foamed mixture into a receptacle and hardening and curing the mixture.

6. A rigid foam composition having thermal insulation and fire retardant properties and a cell structure wherein a majority of cells of the cell structure have a size of from 40 to 60 microns, comprising
  (a) silicon dioxide derived from biomass ash containing diffused activated carbon particles from thermal pyrolysis of the biomass, and
  (b) absorbent/adsorbent filler particles effective to absorb/adsorb water in the rigid foam composition, and
  (c) activated carbon, wherein
  (d) the activated carbon and absorbent/adsorbent particles have a size not disruptive of the cells of the rigid foam structure.

7. The rigid foam composition of claim 6 wherein,
the silicon dioxide comprises from about 7.0 percent to 30.5 percent by weight of the composition,
the absorbent/adsorbent filler particles comprise from about 7.5 percent to 30.5 percent by weight of the composition,
the activated carbon comprises from about 2.5 percent to 22.0 percent by weight of the composition,
and further comprising absorbent/adsorbent water in an amount of from about 42.0 percent to about 57.0 percent by weight of the composition, and
free water in an amount of from about 1.0 percent to about 6.5 percent by weight of the composition.

8. The rigid foam of claim 6 where,
the biomass ash is selected from the group consisting of ash of rice hulls, rice straw, wheat straw, sugarcane baggase, equisetum, palmyra leaves, bamboo stems, and other biogenic materials having qualities of biogenic silica and combinations thereof.

9. The rigid foam of claim 6 where,
the absorbent/adsorbent particles are selected from the group consisting of calcite, bentonite clay, rice hull ash, ground foam scraps and mixtures thereof.

10. The rigid foam composition of claim 6,
further comprising a polymer forming agent selected from the group consisting of sodium fluorosilicate, potassium fluorosilicate, calcium and zinc borates, lithium calcium borates, sodium calcium borates, and boric acid.

* * * * *